(12) United States Patent
Khosla et al.

(10) Patent No.: US 10,944,252 B2
(45) Date of Patent: Mar. 9, 2021

(54) SURGE PROTECTION DEVICE

(71) Applicants: Sanjeev Khosla, New Delhi (IN); Aarti Khosla, New Delhi (IN)

(72) Inventors: Sanjeev Khosla, New Delhi (IN); Aarti Khosla, New Delhi (IN)

( * ) Notice: Subject to any disclaimer, the term of this patent is extended or adjusted under 35 U.S.C. 154(b) by 223 days.

(21) Appl. No.: 16/317,564

(22) PCT Filed: Jul. 12, 2017

(86) PCT No.: PCT/IB2017/054199
§ 371 (c)(1),
(2) Date: Jan. 14, 2019

(87) PCT Pub. No.: WO2018/011723
PCT Pub. Date: Jan. 18, 2018

(65) Prior Publication Data
US 2019/0372332 A1    Dec. 5, 2019

(30) Foreign Application Priority Data
Jul. 12, 2016    (IN) .............................. 201611023852

(51) Int. Cl.
*H02H 3/00*    (2006.01)
*H02H 3/22*    (2006.01)
*H01H 71/12*    (2006.01)

(52) U.S. Cl.
CPC .............. *H02H 3/22* (2013.01); *H01H 71/12* (2013.01)

(58) Field of Classification Search
None
See application file for complete search history.

(56) References Cited

U.S. PATENT DOCUMENTS

| | | | |
|---|---|---|---|
| 6,055,435 A * | 4/2000 | Smith | H04B 3/54 370/487 |
| 9,433,055 B2 * | 8/2016 | Esaki | H05B 45/50 |
| 9,787,081 B2 * | 10/2017 | Dawley | H02H 1/0007 |
| 10,014,680 B2 * | 7/2018 | Dawley | H02H 9/005 |

* cited by examiner

*Primary Examiner* — Stephen W Jackson
(74) *Attorney, Agent, or Firm* — Reches Patent

(57) ABSTRACT

The invention relates to an improved surge protection device comprising a fast acting, self-restoring circuit breaker, preferably, along with surge arrestor/absorber to improve the protection and availability of the equipment which is in use with power source affected with surges/spikes which otherwise would have operated the spike/surge arrestor in-built in the equipment that would have led to its non-availability, and protection for equipment that may or may not be having in-built overcurrent, surge protection devices.

21 Claims, 8 Drawing Sheets

SURGE PROTECTION DEVICE

FIELD OF INVENTION

The invention relates to an improved surge protection device comprising a fast acting, self-restoring circuit breaker, preferably, along with surge arrestor/absorber to improve the protection and availability of the equipment which is in use with power source affected with surges/spikes, overvoltage which otherwise would have damaged the equipment and/or operated the spike/surge arrestor in-built in the equipment that would have led to its non-availability, and protection for equipment that may or may not be having in-built overcurrent surge protection devices.

BACKGROUND AND PRIOR ART

Surge protection is a big concern even today where electronic devices are used. The conventional surge protection devices are non-self restoring. Thus, their operation makes the equipment in operational. The ones which have NO/NC switches are not, in fact, enough for electronic devices. Further, though they can disconnect and protect the equipment in accordance with their capacity, in use under high voltage operation, however, under long duration surges, they cannot rule out the possibility getting incapacitated or operating the circuit breaker and permanently disconnecting the equipment in use, or even operation of Metal Oxide Varistor (MOV) or equivalent type surge/spike arrestor provided in the equipment to operate and render the equipment inoperational or which even lead to failure of electronic components in the equipment where power sources are frequently affected by spikes and surges. The surge/spike arrestors are designed around semiconductors with or without external Surge Protective Devices (SPD) used in electronic circuits no matter how failures occur due to surges and spikes. Today, electronic circuits are used almost everywhere. Surges and spikes are generated in electrical supply systems where loads get switched in and out, particularly inductive loads and also in comprehensive installations during the course of maintenance work or due to any degradation over time as a result of phase decompensation, which is usually caused by the neutral conductor breaking, its faulty connection or faults in transformer centres.

The term surge protection device (SPD) or transient voltage surge suppressor (TVSS), are used to describe electrical devices typically installed in power distribution panels, process control systems, communications systems, and other industrial systems, for the purpose of protecting against electrical surges and spikes, including those caused by lightning. Scaled-down versions of these devices are installed as per need. Some of the commonly used terminologies related to the subject are Clamping Voltage, Joules Rating, Response time, standards, and the components used are Metal Oxide Varistor (MOV), Transient Voltage suppression(TVS) diode, Thyristor surge protection device, Gas Discharge tube (GDT), etc.

A surge protector attempts to limit the voltage supplied to an electric device by either blocking or by shorting to ground any unwanted voltages above a safe threshold, wherein, such operation is limited to a number of times after which breakdown is imminent.

Normal practice is to provide a fuse in series with MOV across the line at the power input before feeding the supply into the device being protected. MOV would absorb the spikes and when the duration of the surge/overvoltage condition is larger, say greater than (>) 25 ms, it will clamp the voltage and eventually break down in short circuit mode thereby blowing the input fuse and disconnect the device from the faulty power supply. In the event only MOV is provided then the circuit breaker in the power source output circuit would operate.

In a more comprehensive design the MOV is provided separately between the line conductor and earth wire and neutral conductor and earth wire. Normally, this would affect the dielectric strength when all three wires are looped and strength checked with respect to the casing when made of metal. In order to improve upon this, the connection may be made through Gas Discharge Tube (GDT).

With the innovations in electronics more power packed, higher performance devices and more expensive devices, having higher utility are easily available to consumers for domestic and common utility applications. The primary power source is AC supply and is often affected by surges and spikes on it which makes the electronic equipment vulnerable. However, there is no such protection available which will ensure that the equipment in use is not affected or made inoperative.

For example, it is now becoming common to use LED lighting units. However, they are significantly higher in price, besides being more vulnerable to failure on surges and spikes. It is a common practice to provide a MOV, MOV cum fuse combination and multiple MOV, MOV cum GDT (Gas Discharge Tube) and so on. All such protections either arrest or suppress surges/spikes. However, they have their boundaries of performance beyond which they fail and the protected device is then affected or damaged or becomes dysfunctional. This not only causes monetary loss but also creates inconvenience and discomfort with respect to the utility it is serving.

U.S. Ser. No. 14/854,802 relates to a surge protected power supply for feeding a device with electrical energy. The power supply includes a surge protection device SPD connected in series with a controllable switch where this series connection is connected between two current conductors of the power supply. The power supply further includes a device for determining a comparison voltage such that the comparison voltage is in some form indicative of a surge voltage present at the input of the power supply. This comparison voltage then is compared to a threshold. If the comparison voltage is higher than the threshold, the controllable switch is closed such that the SPD in series with the switch is effectively connected between the two current conductors to divert the surge current through the SPD. If the comparison voltage is lower than the threshold the switch remains open.

EP14405070 relates to a surge protected power supply (10) for feeding a device (12) with electrical energy. The power supply (10) includes a surge protection device SPD (5) connected in series with a controllable switch (7) where this series connection is connected between two current conductors (2.1, 2.2) of the power supply (10). The power supply (10) further includes a device (8) for determining a comparison voltage such that the comparison voltage is in some form indicative of a surge voltage present at the input of the power supply. This comparison voltage then is compared to a threshold. If the comparison voltage is higher than the threshold, the controllable switch (7) is closed such that the SPD (5) in series with the switch (7) is effectively connected between the two current conductors (2.1, 2.2) to divert the surge current through the SPD (5). If the comparison voltage is lower than the threshold the switch (7) remains open.

The above suffers on two accounts (a) the spikes of duration smaller than the response time of the switch go on to effect the equipment being protected, (b) the surge if greater than the absorption power of the SPD will cause SPD to fail and thereby further exposing the equipment to the surge.

It is pertinent to mention that it is not desirable to have a short across the line in many applications as it is unsafe. Further, the surge protection device failure if not detectable in the operation would eventually lead to exposure of the equipment to surges after the failure of the surge protection mechanism in the SPD (Surge Protection Device).

US 20160075236 provides a surge protection device for protecting an on board power system of an electric vehicle from an electric surge, having the following: an input device which is designed as a current terminal of the electric vehicle; a protection device which has at least one surge arrestor for arresting a surge; and an interface device which is designed to protect the on board power system of the electric vehicle from the electric surge by coupling an outlet of the protection device to the on board power system.

EP 298861 relates to a surge protection device (100) for protecting an on-board power system of an electric vehicle from an electric surge, having the following: an input device which is designed as a current terminal of the electric vehicle for coupling with a charging device; a protection device which has at least one surge arrester for arresting a surge; and an interface device which is designed to protect the on-board power system of the electric vehicle from the electric surge by coupling an outlet of the protection device to the on board power system.

EP2860863 provides a surge protection circuit comprising a bridgeless boost sub-circuit and a surge protection sub-circuit, wherein, the bridgeless boost sub-circuit comprises a first connection end and a second connection end of an alternating current power source, an inductor 1, an inductor 2, a switching tube 1 with a damping diode, a switching tube 2 with a damping diode, a capacitor 1, a diode 5, and a diode 6. The surge protection sub-circuit comprises a first connection end and a second connection end of an alternating current power source, a diode 1, a diode 2, a transistor 3, a transistor 4, and a surge buffer device. The embodiment of the present invention provides a new solution for the surge protection, wherein, a surge buffer device is used to absorb a surge current, and the surge buffer device is not in a main topology circuit.

Similarly, US 20160055945, 20160056004, Indian Patent Nos. 53025, 245771 and Indian Patent Application Nos. 1057/DELNP/2014, 1760/DEL/2006 disclose various surge protection devices.

However, none of the devices in the above documents disclose a surge protection device which disconnects the equipment from the power source till acceptable power source conditions are reached and then restores the connection as disclosed in the present invention.

It is pertinent to mention here that it is not desirable to have a short across the line in many applications as it is unsafe. Further, the surge protection device failure if not detectable in the operation would eventually lead to exposure of the equipment to surges after the failure of the surge protection mechanism in the SPD (Surge Protection Device). None of the prior inventions disclose this.

Further, none of the invention discloses the provision of a surge arrestor in the SPD outside the equipment in such a manner that the surge arrestor inside the equipment, where provided, becomes a second level of protection with higher operating voltage than the former which works in conjunction with the fast self-restoring switch having its operating voltage lower than the surge arrestor where provided in the SPD as explained in FIGS. 1, 2, and 3.

Further, in safety critical equipment while it is important to protect them, it is also necessary to sustain the operation of the core in operation. In the present invention, stored power reserve is provided optionally to tide over the disconnection glitches.

In many configurations the effect of surge is caused or increased when the cable going into the field to feed the equipment, particularly underground, becomes leaky to earth, even though it may have been carrying an isolated supply but due to such leakage has become prone to surges and affect of noise, and prone to causing equipment/equipment function failure. The invention provides an in-built facility for earth leakage detection for any or all cable conductors connected to the SPD independently in an isolated electrical earth leakage tester with suitable test enabling push to test switches and colored indicators for indicating earthing leakage.

Therefore, it is an object of this invention to provide an alternative surge protection device which will remove the above deficiencies and provide the necessary protections, functions under abnormal conditions by disconnecting the equipment from the power source and then restoring the connection when the acceptable power source conditions are reached. Any spike attempting to pass through to the equipment before the self-restoring disconnection takes place would also be arrested in this improved device. Provision of extra energy storage on the equipment side to tide over the momentary in-operation, where necessary, is also provided. Optionally, main-standby switchable units put together that may have same or different configuration is provided. In-built earth leakage test facility with independent operation is optionally provided.

SUMMARY OF THE INVENTION

One of the main embodiment of the present invention is to provide a surge protection device (SPD) (3) with fast acting self-restoring circuit breaker along with surge arrestor/absorber (8), the said device (3) connected between an AC or DC power source and a load (4) for protecting the electrical supply feed given to the load (4) from surges, spikes and overvoltage conditions resulting from phase decomposition, induction or any other factor, comprising:

one power supply feed line (1) connected to the load (4) second power supply feed line (2) connected to load (4) after passing through a line switch (7) and is connected to the load (4) under normal operating conditions, and optionally an in-built facility for earth leakage detection, wherein, the said line switch (7) operates to disconnect the line (2) from the load (4) under high voltage condition caused by surges and/or any other means to disconnect the load (4) and any surge/spike arrestor (8) down the line before its operating parameters are exceeded and restores the connection when voltage input is in normal range, wherein the said surge protection device comprises of in-built controlled power source to operate the line switch (7) with self-restoring circuit breaker such that the controlled power source used to operate the line switch (7) constitutes voltage control means (10) which constitutes a fast bridge rectifier (16) to ensure unipolar feed to operate the line switch (7) through peak detector (11), a attenuator-cum-spike shunt (15) to ensure adequate protection to the voltage control means without causing much time delay, the said peak detector

(11) to ensures fast operation on the negative or positive (made unidirectional/unipolar) rising of the surge in either direction beyond the normal operating range, a filter cum time delay (14) desisting the surge from building up in time to pass through it towards the SPD output and the delay is further increased as the surge passes over the spike/surge arrestor (8), a power supply (12) quickly armed to a value of upper limit to operate the line switch (7) in fastest mode without damaging it.

Yet another embodiment of the present invention is to provide a surge protection device (3), wherein the in-built facility of earth leakage detection is preferably provided in device (3) connecting to loads through a cable going into the field to feed a distantly placed load (4), where the cable can be exposed to earth leakage.

Yet still another embodiment of the present invention is to provide a surge protection device (3), wherein the line switch (7) is installed in the line carrying the phase when third line for earth connection is used.

Yet still another embodiment of the present invention is to provide a surge protection device (3), wherein the line switch (7) is installed in the line carrying the phase where possibility of earth leakage exists and/or the supply source is not isolated.

Still yet another embodiment of the present invention is to provide a surge protection device (3), wherein the peak detector (11) takes lead in time as it responds to the peak instead of average and that also through a low time delay path of attenuator-cum-spike shunt (15) which protects the fast device bridge rectifier (16).

Yet still another embodiment of the present invention is to provide a surge protection device (3), wherein the peaks are attenuated far more in filter-cum-time delay (14) and only marginally in the path feeding the Peak Detector (11).

Yet another embodiment of the present invention is to provide a surge protection device (3), wherein the peak detector (11) has a preset threshold to trigger the line switch (7) in time sequence which will not allow any damage to the spike/surge arrestor (8).

Still another embodiment of the present invention is to provide a surge protection device (3), wherein the circuit breaker operation time is less than the time for which surge protector/spike arrestor can survive for the voltage and energy limit.

Another embodiment of the present invention is to provide a surge protection device (3), wherein the filter-cum-time delay (14) is a combination of inductors and capacitors.

Still another embodiment of the present invention is to provide a surge protection device (3), wherein the voltage control means has an attenuator-cum-spike shunt (15), spike arrestor (8), bridge rectifier (16), and series parallel diodes in bridge rectifier (16) alone or in any combination thereof.

Another embodiment of the present invention is to provide a surge protection device (3), wherein the power supply lines (1 and 2) pass through a choke (5, 5a, 5b).

Still another embodiment of the present invention is to provide a surge protection device (3), wherein the said choke (5) is a common mode choke for power supply lines (1 and 2).

Another embodiment of the present invention is to provide a surge protection device (3), wherein the said voltage control means has a fast bridge rectifier (16) and attenuator-cum-spike shunt (15) to increase the upper voltage operating range of the line switch (7).

Yet another embodiment of the present invention is to provide a surge protection device (3), wherein the said line switch (7) is a fast operating relay with at least one NO/NC contact.

Still another embodiment of the present invention is to provide a surge protection device (3), wherein the power supply line (1) of the load comprises of a fuse (9) and optionally a fuse blown indicator in series on either side.

Another embodiment of the present invention is to provide a surge protection device (3), wherein the load (4) has an in-built surge/spike arrestor on the load side after the fuse, and voltage rating higher than the line switch trigger voltage to blow the fuse in device (3) in case of failure of line switch (7) or itself.

Still another embodiment of the present invention is to provide a surge protection device (3), wherein the load has a line switch (7) with faster operating time than the operating time of the in-built surge/spike arrestor.

Yet another embodiment of the present invention is to provide a surge protection device (3), wherein the in-built surge/spike arrestor has lower damping voltage than the external surge/spike arrestor, if provided, in or along the load (4).

Another embodiment of the present invention is to provide a surge protection device (3), wherein the said line switch (7) has a lower operating voltage than the damping voltage of in-built surge/spike arrestor so that the voltage of in-built surge/spike arrestor does not break down and operate the fuse or external circuit breaker, and whereby the operating voltage of the line switch (7) is also lower than the damping voltage of external surge/spike arrestor, if any.

Still another embodiment of the present invention is to provide a surge protection device (3), wherein the said device (3) is provided in main and standby switchable configuration of the same or different configuration preferably with a changeover switch.

Yet still another embodiment of the present invention is to provide a surge protection device (3), wherein, optionally, a controlled power source (6) is used to work as an energy source required to prevent temporary disruption of energy supply to the load/equipment during the temporary disconnection caused by the line switch (7) operation.

Still another embodiment of the present invention is to provide a surge protection device (3) wherein the in-built facility for earth leakage detection for any or all cable conductors is connected to the device (3) independently in an isolated electrical circuit with suitable test enabling push to test switches and preferably different colored indicators for each line to indicate whether there is earthing leakage or not in any of the lines individually.

Yet still another embodiment of the present invention is to provide a surge protection device (3), wherein the device (3) can be employed in railway rolling stock mounted equipment, telecommunication equipment, as well as in all general LED lighting applications.

Another embodiment of the present invention is to provide a method of working of a surge protection device (3), for protecting electrical supply systems from surges and spikes resulting from phase decomposition, wherein the operation of the line switch (7) takes a time lead over the surge reaching the output terminals of the SPD, wherein a filter-cum-time delay (14) which is a combination of inductor(s) and capacitor(s) and the controlled power source desists the surge from building up in time to pass through the filter towards the device (3) output and the delay is further increased as the surge passes over the spike/surge arrestor wherein the operating design of the line switch (7) is well below the upper limit of the normal operating range of the input supply so that at connection of input supply in time sequence the power supply (12) to operate the line switch (7a,b,c) gets ready even before the supply that reaches the load (4) has reached its normal state, a power supply (12) to operate the line switch upon trigger from the peak detector (11) such that the peak detector (11) takes lead in time as it responds to the peak instead of average and that also through a low time delay path of attenuator-cum-spike shunt (15) which protects the fast bridge rectifier (16), wherein the peak detector (11) has a preset threshold to trigger the line switch (7) in time sequence which will not allow any damage to the spike/surge arrestor (8) or allow any violation of the input condition of the load to pass through.

OBJECT OF THE INVENTION

One of the object of the present invention is to provide an improved surge protection device comprising a fast acting, self-restoring circuit breaker, preferably, along with surge arrestor/absorber to improve the availability of the equipment in use with power source affected with surges/spikes.

Another object of the invention is to provide an improved surge protection device wherein any spike attempting to pass through to the equipment before the self-restoring disconnection is arrested.

DETAILED DESCRIPTION OF THE INVENTION

The present invention provides an improved surge protection device (SPD) for an electronic equipment comprising a self-restoring circuit breaker preferably along with surge arrestor/absorber to improve the availability of the equipment in use with power source affected with surges/spikes.

The circuit breaker can be a fast acting relay or any means having a NO/NC contact(s) made to operate through the voltage control means such that it opens before the internal and/or external surge/spike arrestor(s), if the system breakdown voltages are crossed. It not only protects the equipment but also the surge absorbers/spike arrestors like MOV or other devices being used in the system so that their operating life is substantially enhanced or not affected.

Figure 1:
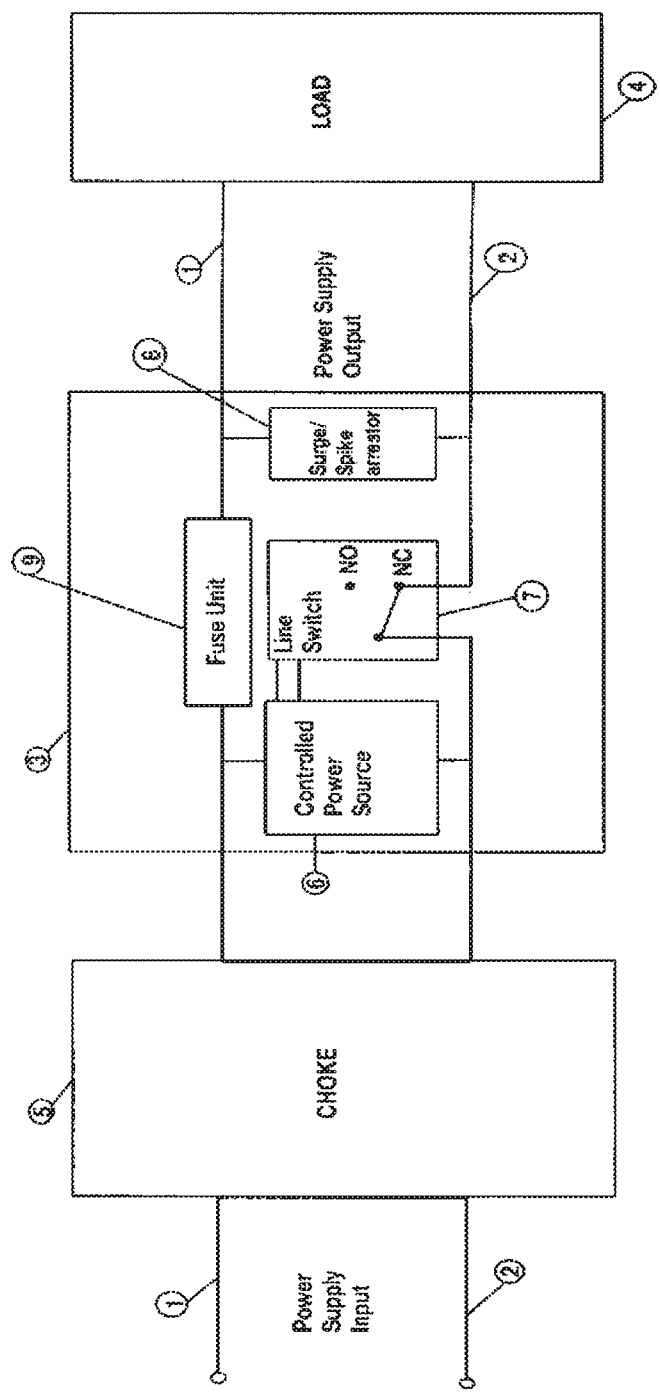
FIG. 1 shows the device (3) connection with power source line 1 and line 2 and load

FIG. 1 shows input supply line 1 and 2 passing through the external optional choke (needed more for AC supply circuits), both the lines then connecting to the SPD(3), having a controlled power source (6) to detect the condition and operate the line switch (7) which can switch line 2 to disconnect the equipment under unsafe conditions. The SPD having a surge arrestor (8) after the line switch (7) towards the load (4) side whose operating voltage is higher than the line switch (7) when operated to disconnect the load (4) but preferably lower than the surge/spike arrestor, if any, provided in the load. In the event, the spike/surge arrestor in the SPD operates, which would normally be in the event line switch or its required operation has failed, it disconnects the fuse (9) (optional) or the external circuit breaker. Lines 1 and 2 pass out of the SPD and connect to the load.

Figure 2:
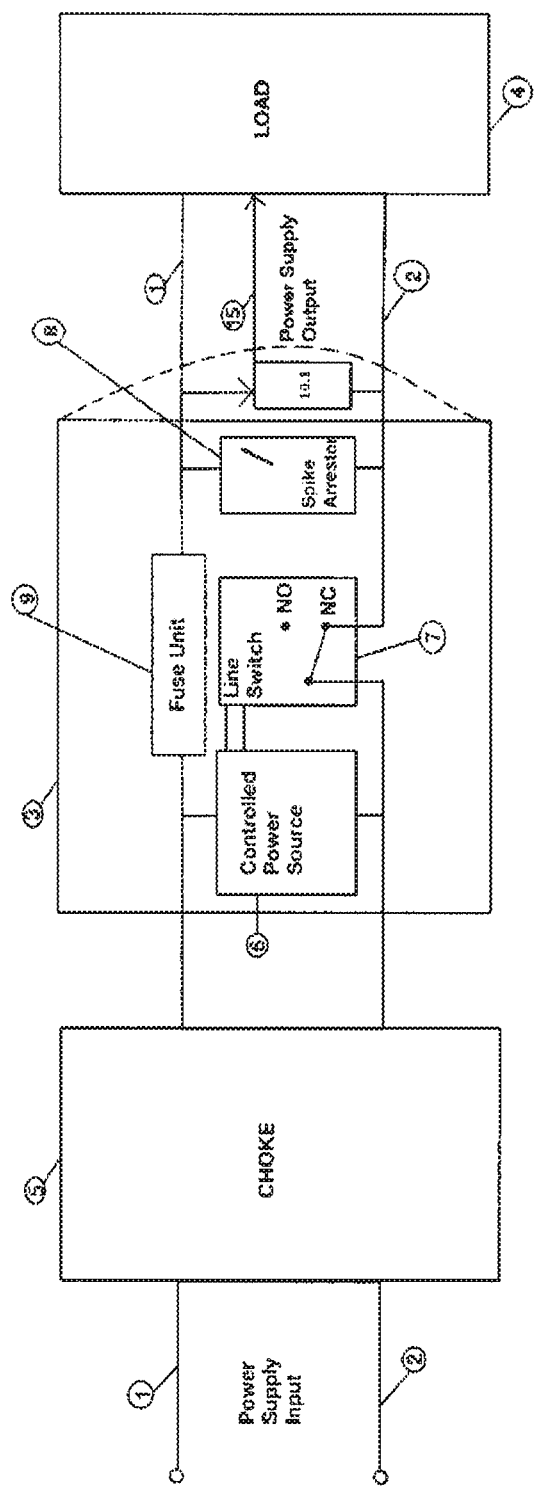
FIG. 2 shows the device (3) connection with power source and load with optional power storage (10.1)

FIG. 2 shows provision of extra energy storage on the equipment/load side where in-operation caused due to short term disconnection is to be avoided and the equipment is also to be protected from damage. Such stored energy can also be incorporated in the load where it is critical only to keep the core part in operation, and when incorporated in conjunction or as a part of SPD it can be permanently connected when fed by the same energy source or it can get connected through a Normally Open (NO) contact when the disconnection takes place as per the requirement.

Figure 3:
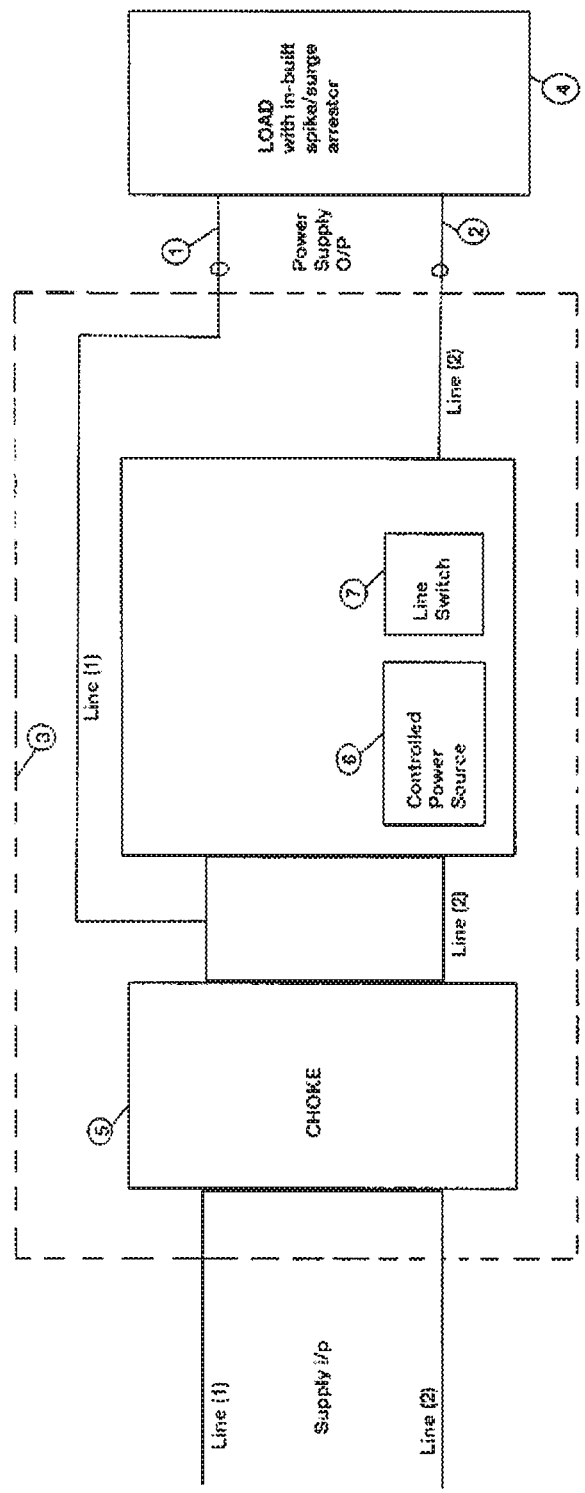
FIG. 3 shows some of the components of device (3)
Figure 4:
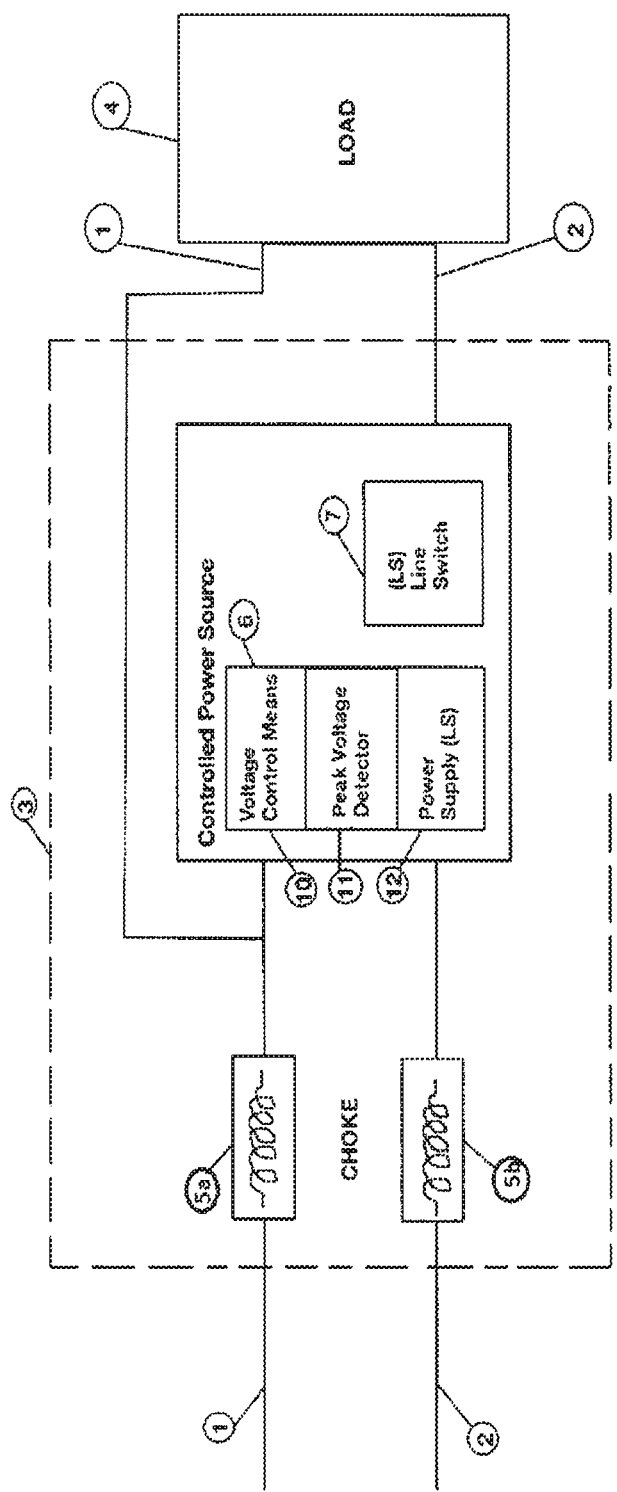
FIGS. 4 & 5 shows the controlled power source components and configurations of choke

FIGS. 3 and 4 shows an SPD with inbuilt choke. The choke wherever used for AC supply system could be optionally a common mode choke.

Figure 5:
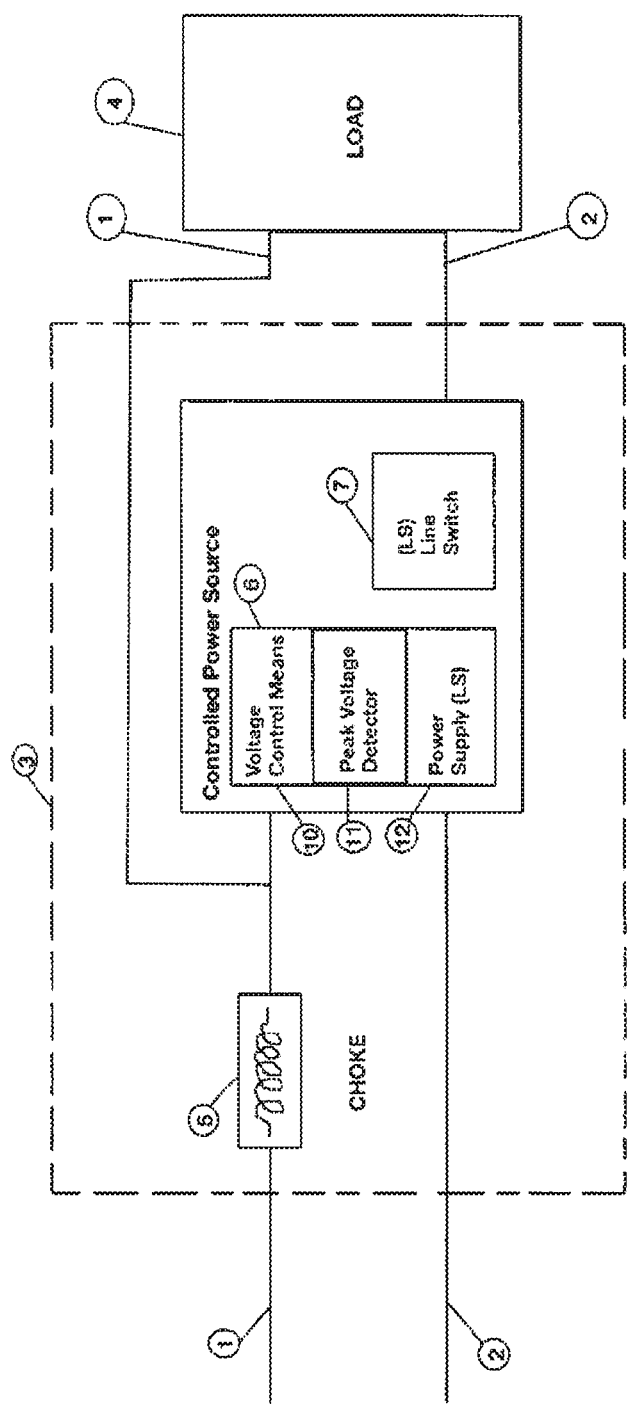

FIG. 5 shows the details of the Controlled Power Source (6) which could optionally have peak voltage detector (11) to operate the line switch with minimum loss of time, voltage control means (10) to detect the surge operating point and a power supply (12) to operate the line switch. The power supply may also be used to maintain a storage energy means to prevent loss of information or inoperative state between disconnection and re-connection caused by line switch (7) while protecting the equipment/load.

Figure 6:
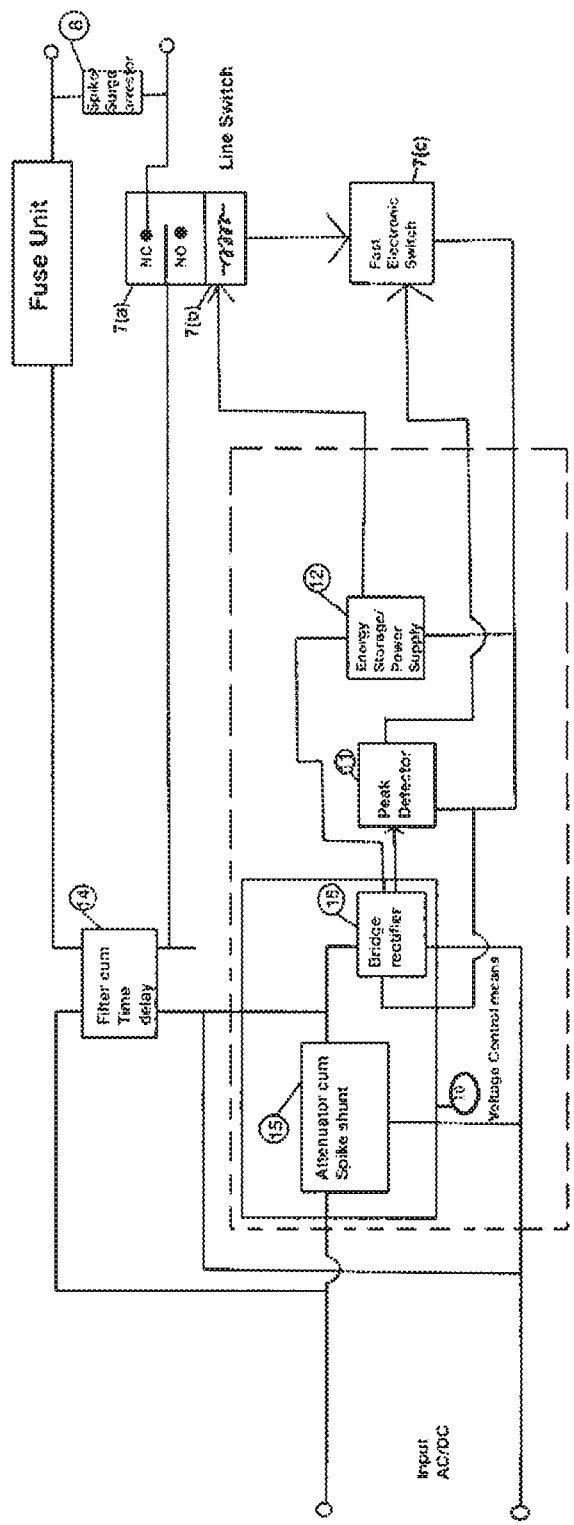
FIG. 6 shows some internal details of the components and a configuration of controlled power source of SPD device (3)

FIG. 6 shows the operation of the line switch (7a,b,c)

Figure 7:
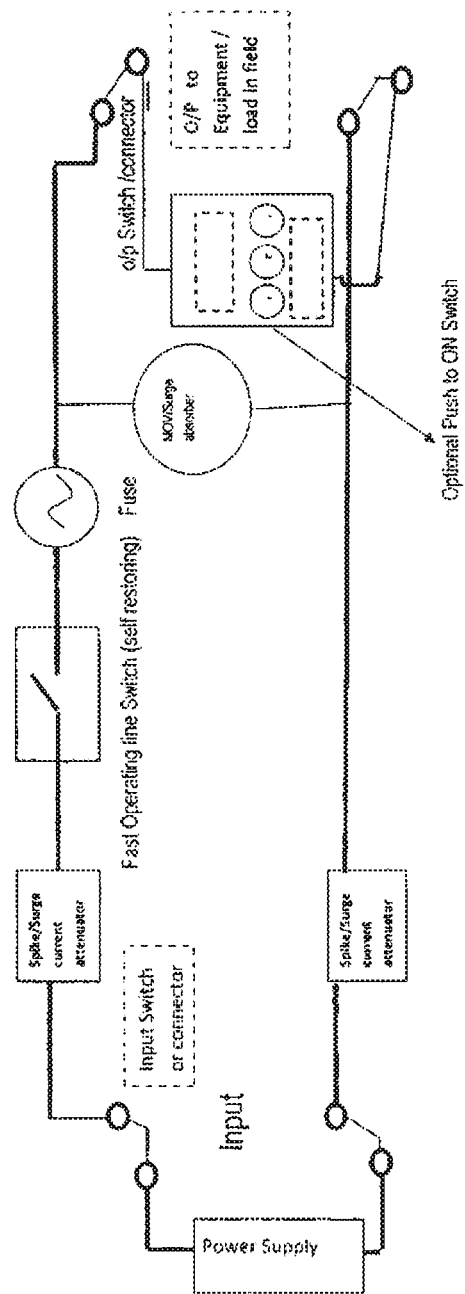
FIG. 7 shows working connection details of device (3) inclusive of earth leakage detector with optional Push to ON switch to detect, when required, earth leakage on either line individually.

FIG. 7 shows a schematic flow diagram of the improved surge protection device (3) with electrically isolated earth leakage tester unit. Each line is connected for leakage test through separate push to test switches and any leakage current with earth connection when detected will light up the particular line's designated indicator. The indicator for leakage test ON is separate. Upon release of the push-to-test switch the earth leakage detector gets isolated. Input and output lines are connected to the SPD through connector or switch as per usage needs. The input power may be disconnected when this test is conducted. The output connection can be switchable to select two different lines, in the event earth fault is detected in one pair the operation can be shifted to the other pair.

Figure 8:
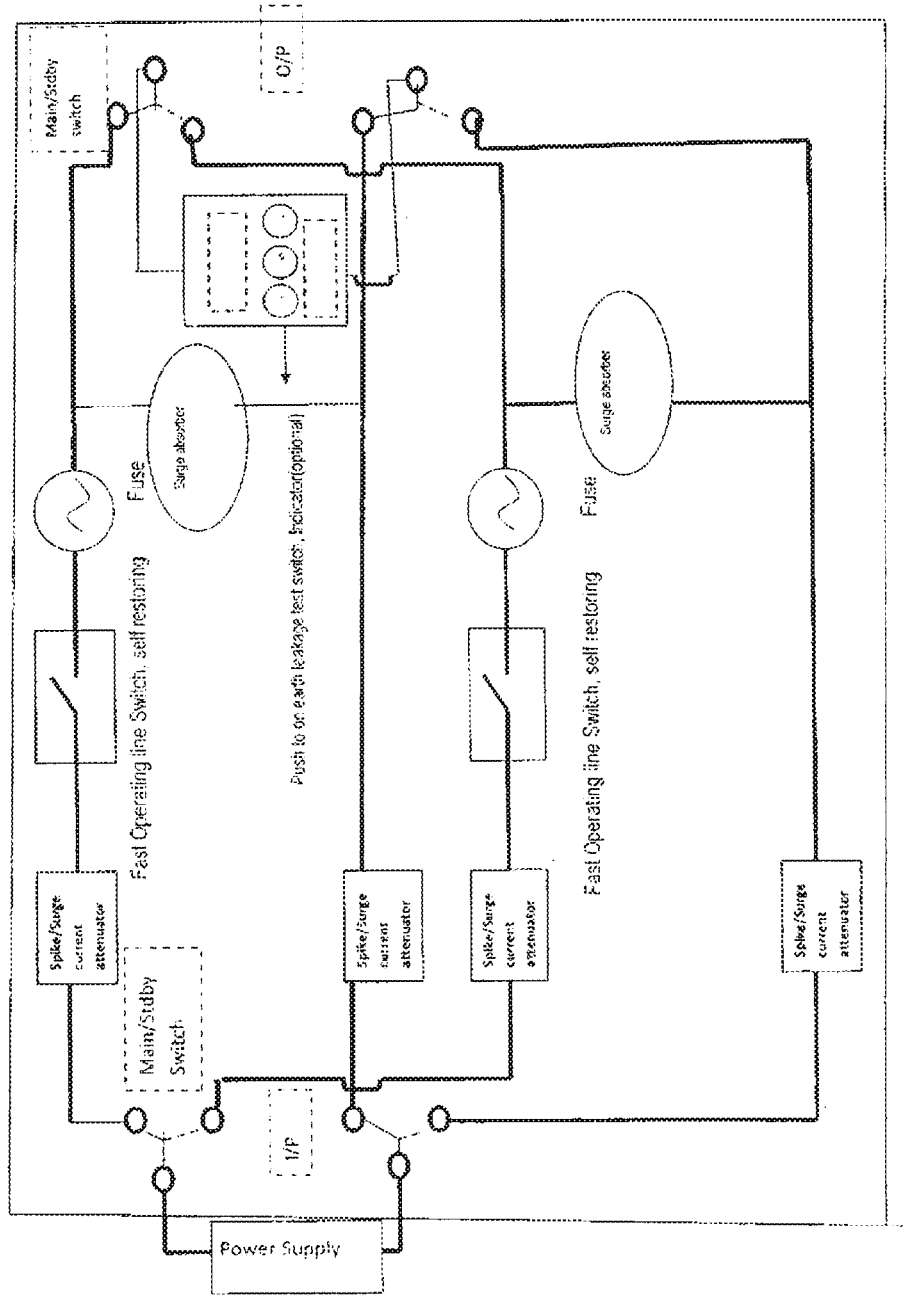
FIG. 8 shows the working connection details of main and standby device (3)

FIG. 8 shows one example of the main and standby configurations with optional earth leakage detector. Here the input can be switched to standby SPD in case of fault in main SPD. Further, in another configuration the output lines can also be switchable in case if earth fault in one pair the operation can be shifted to the other output pair One of the objectives of the invention is that the line switch should operate well before any damage is caused to the SPD or the load equipment due to voltage surges or spikes in the input supply, which may then result in the equipment to become in-operational due to SPD or equipment failure.

There are two configurations of SPD, one where the load equipment and its input protection internal details are available and/or input protection and input power/internal supply details are available and the other where specific internal details are not available.

The second configuration is shown in FIG. 2a where also the method by which the operation of the line switch (7a,b,c) leads in time to cut-off the line before the quantum surge reaching the spike/surge arrestor (8) or the output terminals of SPD to load reaches a harmful state.

The fast operation of the protection device/line switch is achieved by placing the components of the controlled power source in the SPD in a manner that operation of the line switch when required takes a time lead over the surge reaching the output terminals of the SPD. The filter-cum-time delay a combination of inductor(s) and capacitor(s) desists the surge from building up in time to pass through it towards the SPD output and the delay is further increased as the surge passes over the spike/surge arrestor due the inherent properties of the same. The operating design of the line switch (7) is well below the upper limit of the normal operating range of the input supply. Thus, at switch on/connection of input supply in time sequence the energy storage/power supply (12) to operate the line switch (7a, b, c) gets ready even before the supply reaching the Load has reached its normal state. Thus, the power supply (12) is armed to operate the line switch (7) upon trigger from the peak detector (11). The peak detector (11) takes lead in time as it responds to the peak instead of average and that also through a low time delay path of attenuator-cum-spike shunt (15) which protects the voltage control means which can be a simple fast device bridge rectifier. Thus, whereas the peaks are attenuated far more in filter-cum-time delay (14) but only marginally in the path feeding the peak detector. The peak detector has a preset threshold to trigger the line switch in time sequence which will not allow any damage to the spike/surge arrestor (8) or allow anything violating the input condition of the load to pass through the fast operation (operation time 20 ms from the appearance of Power Supply) electromechanical relay of suitable rating contacts, from a fully pre-energised energy tank during normal operation for immediate operation of the relay typically operating it in few milliseconds. Provision of additional energy source unit (10) results in further augmenting the protection.

The circuit breaker operation time is less than the time for which surge protector/spike arrestor can survive for the voltage and energy limit, thus before the time in which the breakdown of the surge/spike arrestor would occur the line switch would disconnect the surge energy flowing in. Thus, two conditions are met:
  a. the surge protection in the SPD optionally provided prevents the breakdown of the surge protection which may be provided in the load equipment
  b. the self restoring line switch prevents the breakdown both of the surge protection provided optionally in the SPD and the surge protection provided in the load equipment and maintains the availability of the load equipment despite the surges on the power supply feeding it, which otherwise would have damaged the load equipment in the absence of SPD A table (TABLE 1) showing the necessary parameters for a railway application employing the surge protection device of the present invention is provided herein below:

TABLE 1

| Supply Rating | Supply Type | Supply Upper Limit | Equipment Load Limit (KW) | Energy absorption (2 ms) Wmax (J) | Surge Dissipation Capacity KV | Surge Dissipation Capacity (J) | max surge peak Current Capacity (8/20 μs) | Line Switch Response Time (ms) | Line Switch Operating Voltage | Line Switch Restoring Voltage | Surge Suppressor Clamping voltage(8/20 μs) | Peak High Voltage SPD Rating (V) |
|---|---|---|---|---|---|---|---|---|---|---|---|---|
| 60 | VDC | 78 | 1 | 106 | 0.016 | 106 | 6500 A | <20 milisecond | 85 ± 5 | 70 ± 5 | 250 | 1500 |
|  |  |  | 10 | 106 | 0.016 | 106 | 6500 A | <20 milisecond | 85 ± 5 | 70 ± 5 | 250 | 1500 |
| 60 | VAC | 78 | 1 | 106 | 0.016 | 106 | 6500 A | <20 milisecond | 85 ± 5 | 70 ± 5 | 250 | 1500 |
|  |  |  | 10 | 106 | 0.016 | 106 | 6500 A | <20 milisecond | 85 ± 5 | 70 ± 5 | 250 | 1500 |
| 110 | VDC | 143 | 1 | 155 | 0.009 | 155 | 6500 A | <20 milisecond | 158 ± 5 | 140 ± 5 | 300 | 1500 |
|  |  |  | 10 | 155 | 0.009 | 155 | 6500 A | <20 milisecond | 158 ± 5 | 140 ± 5 | 300 | 1500 |
| 110 | VAC | 143 | 1 | 155 | 0.009 | 155 | 6500 A | <20 milisecond | 158 ± 5 | 140 ± 5 | 300 | 1500 |
|  |  |  | 10 | 155 | 0.009 | 155 | 6500 A | <20 milisecond | 158 ± 5 | 140 ± 5 | 300 | 1500 |
| 220 | VDC | 286 | 1 | 330 | 0.045 | 330 | 6500 A | <20 milisecond | 315 ± 10 | 280 ± 10 | 775 | 1500 |
|  |  |  | 10 | 330 | 0.045 | 330 | 6500 A | <20 milisecond | 315 ± 10 | 280 ± 10 | 775 | 1500 |
| 220 | VAC | 286 | 1 | 330 | 0.045 | 330 | 6500 A | <20 milisecond | 315 ± 10 | 280 ± 10 | 775 | 1500 |
|  |  |  | 10 | 330 | 0.045 | 330 | 6500 A | <20 milisecond | 315 ± 10 | 280 ± 10 | 775 | 1500 |

The controlled power source used to operate the line switch (7) constitutes voltage control means (10) which may constitute a fast bridge rectifier (16) to ensure unipolar feed to operate the line switch through peak detector, a attenuator-cum-spike shunt (15) to ensure adequate protection to the voltage control means without causing much time delay wherein peak detector (11) ensures fast operation on the negative or positive (made unidirectional/unipolar) rising of the surge in either direction beyond the normal operating range, a power supply (12) quickly armed to a value of upper limit to operate the line switch (7) in fastest mode without damaging it.

The applications wherein the surge protection device may be used are in railway rolling stock mounted equipment, telecommunication equipment, as well as in all general LED lighting applications.

Typical operation parameters that are utilized is provided in Table 2 below:

TABLE 2

(Operational Parameters)

| S. No. | Functional Requirement | Rating |
|---|---|---|
| 1. | Nominal System Supply Voltage | 110 VAC  110 VDC  220 VAC  220 VDC |
| 2. | Surge Absorber operating voltage (SAV) | Up to 20% above Equipment Upper Rated Voltage limit or 10% lower to the MOV/arrestor Voltage in equipment, whichever is lower |
| 3 | Line Switch Response Time | <20 ms |
| 4. | Surge Absorber Energy Dissipation | >100 Joules |
| 5. | Arrestor Surge Current Withstand Capability | >6500 A |
| 6. | Line Switch Operating Voltage (SOV) | 10% lower to SAV |
| 7. | Line Switch Restore Voltage | 5 to 10% lower to SOV |
| 8. | Surge Attenuator type | Common Mode |
| 9. | Earth Leakage indicator line 1 | RED (Optional see 12 below) |
| 10. | Earth Leakage indicator Line 2 | Yellow (Optional see 12 below) |

One of the main embodiment of the present invention is to provide a surge protection device (SPD) (3) with fast acting self-restoring circuit breaker along with surge arrestor/absorber (8), the said device (3) connected between an AC or DC power source and a load (4) for protecting the electrical supply feed given to the load (4) from surges, spikes and overvoltage conditions resulting from phase decomposition, induction or any other factor, comprising:

one power supply feed line (1) connected to the load (4)
second power supply feed line (2) connected to load (4) after passing through a line switch (7) and is connected to the load (4) under normal operating conditions, and optionally an in-built facility for earth leakage detection, wherein, the said line switch (7) operates to disconnect the line (2) from the load (4) under high voltage condition caused by surges and/or any other means to disconnect the load (4) and any surge/spike arrestor (8) down the line before its operating parameters are exceeded and restores the connection when voltage input is in normal range, wherein the said surge protection device comprises of in-built controlled power source to operate the line switch (7) with self-restoring circuit breaker such that the controlled power source used to operate the line switch (7) constitutes voltage control means (10) which constitutes a fast bridge rectifier (16) to ensure unipolar feed to operate the line switch (7) through peak detector (11), a attenuator-cum-spike shunt (15) to ensure adequate protection to the voltage control means without causing much time delay, the said peak detector (11) to ensures fast operation on the negative or positive (made unidirectional/unipolar) rising of the surge in either direction beyond the normal operating range, a filter cum time delay (14) desisting the surge from building up in time to pass through it towards the SPD output and the delay is further increased as the surge passes over the spike/surge arrestor (8), a power supply (12) quickly armed to a value of upper limit to operate the line switch (7) in fastest mode without damaging it.

Yet another embodiment of the present invention is to provide a surge protection device (3), wherein the in-built facility of earth leakage detection is preferably provided in device (3) connecting to loads through a cable going into the field to feed a distantly placed load (4), where the cable can be exposed to earth leakage.

Yet still another embodiment of the present invention is to provide a surge protection device (3), wherein the line switch (7) is installed in the line carrying the phase when third line for earth connection is used.

Yet still another embodiment of the present invention is to provide a surge protection device (3), wherein the line switch (7) is installed in the line carrying the phase where possibility of earth leakage exists and/or the supply source is not isolated.

Still yet another embodiment of the present invention is to provide a surge protection device (3), wherein the peak detector (11) takes lead in time as it responds to the peak instead of average and that also through a low time delay path of attenuator-cum-spike shunt (15) which protects the fast device bridge rectifier (16).

Yet still another embodiment of the present invention is to provide a surge protection device (3), wherein the peaks are attenuated far more in filter-cum-time delay (14) and only marginally in the path feeding the Peak Detector (11).

Yet another embodiment of the present invention is to provide a surge protection device (3), wherein the peak detector (11) has a preset threshold to trigger the line switch (7) in time sequence which will not allow any damage to the spike/surge arrestor (8).

Still another embodiment of the present invention is to provide a surge protection device (3), wherein the circuit breaker operation time is less than the time for which surge protector/spike arrestor can survive for the voltage and energy limit.

Another embodiment of the present invention is to provide a surge protection device (3), wherein the filter-cum-time delay (14) is a combination of inductors and capacitors.

Still another embodiment of the present invention is to provide a surge protection device (3), wherein the voltage control means has an attenuator-cum-spike shunt (15), spike arrestor (8), bridge rectifier (16), and series parallel diodes in bridge rectifier (16) alone or in any combination thereof.

Another embodiment of the present invention is to provide a surge protection device (3), wherein the power supply lines (1 and 2) pass through a choke (5, 5a, 5b).

Still another embodiment of the present invention is to provide a surge protection device (3), wherein the said choke (5) is a common mode choke for power supply lines (1 and 2).

Another embodiment of the present invention is to provide a surge protection device (3), wherein the said voltage control means has a fast bridge rectifier (16) and attenuator-cum-spike shunt (15) to increase the upper voltage operating range of the line switch (7).

Yet another embodiment of the present invention is to provide a surge protection device (3), wherein the said line switch (7) is a fast operating relay with at least one NO/NC contact.

Still another embodiment of the present invention is to provide a surge protection device (3), wherein the power supply line (1) of the load comprises of a fuse (9) and optionally a fuse blown indicator in series on either side.

Another embodiment of the present invention is to provide a surge protection device (3), wherein the load (4) has an in-built surge/spike arrestor on the load side after the fuse, and voltage rating higher than the line switch trigger voltage to blow the fuse in device (3) in case of failure of line switch (7) or itself.

Still another embodiment of the present invention is to provide a surge protection device (3), wherein the load has a line switch (7) with faster operating time than the operating time of the in-built surge/spike arrestor.

Yet another embodiment of the present invention is to provide a surge protection device (3), wherein the in-built surge/spike arrestor has lower damping voltage than the external surge/spike arrestor, if provided, in or along the load (4).

Another embodiment of the present invention is to provide a surge protection device (3), wherein the said line switch (7) has a lower operating voltage than the damping voltage of in-built surge/spike arrestor so that the voltage of in-built surge/spike arrestor does not break down and operate the fuse or external circuit breaker, and whereby the operating voltage of the line switch (7) is also lower than the damping voltage of external surge/spike arrestor, if any.

Still another embodiment of the present invention is to provide a surge protection device (3), wherein the said device (3) is provided in main and standby switchable configuration of the same or different configuration preferably with a changeover switch.

Yet still another embodiment of the present invention is to provide a surge protection device (3), wherein, optionally, a controlled power source (6) is used to work as an energy source required to prevent temporary disruption of energy supply to the load/equipment during the temporary disconnection caused by the line switch (7) operation.

Still another embodiment of the present invention is to provide a surge protection device (3) wherein the in-built facility for earth leakage detection for any or all cable conductors is connected to the device (3) independently in an isolated electrical circuit with suitable test enabling push to test switches and preferably different colored indicators for each line to indicate whether there is earthing leakage or not in any of the lines individually.

Yet still another embodiment of the present invention is to provide a surge protection device (3), wherein the device (3) can be employed in railway rolling stock mounted equipment, telecommunication equipment, as well as in all general LED lighting applications.

Another embodiment of the present invention is to provide a method of working of a surge protection device (3), for protecting electrical supply systems from surges and spikes resulting from phase decomposition, wherein the operation of the line switch (7) takes a time lead over the surge reaching the output terminals of the SPD, wherein a filter-cum-time delay (14) which is a combination of inductor(s) and capacitor(s) and the controlled power source desists the surge from building up in time to pass through the filter towards the device (3) output and the delay is further increased as the surge passes over the spike/surge arrestor wherein the operating design of the line switch (7) is well below the upper limit of the normal operating range of the input supply so that at connection of input supply in time sequence the power supply (12) to operate the line switch (7a,b,c) gets ready even before the supply that reaches the load (4) has reached its normal state, a power supply (12) to operate the line switch upon trigger from the peak detector (11) such that the peak detector (11) takes lead in time as it responds to the peak instead of average and that also through a low time delay path of attenuator-cum-spike shunt (15) which protects the fast bridge rectifier (16), wherein the peak detector (11) has a preset threshold to trigger the line switch (7) in time sequence which will not allow any damage to the spike/surge arrestor (8) or allow any violation of the input condition of the load to pass through.

Although, the present invention has been described with reference to features, it will be apparent to those skilled in the art that this description is only a preferred embodiment and does not limit the scope of the present invention. Variations and modifications are possible without departing from the scope and spirit of the invention disclosed/described herein and are intended to be encompassed therein.

We claim:

1. A surge protection device (SPD) (3) connected between an AC or DC power source and a load (4) for protecting the load (4) from surges, spikes and overvoltage conditions in the AC or DC power source, the said device comprising: power supply feed lines (1; 2); a circuit breaker line switch connected to the power supply feed lines (1; 2); a filter cum time delay circuit (14) connected so as to be downstream of the circuit breaker line switch; a fuse (9) connected downstream of filter cum time delay circuit (14); and a surge/spike arrestor (8) connected downstream of the time delay circuit (14); the circuit breaker line switch comprises a self-restoring line switch (7) connected to the power supply feed lines, and a controlled power source (6) for operating the self-restoring line switch (7); the self-restoring line switch (7) comprises a Normally Closed contact making switch (7a), an energizing coil (7b) operating the Normally Closed contact making switch (7a), and a fast electronic switch (7c) for controlling an energizing current flowing through the energizing coil (7b); the controlled power source (6) comprises a peak detector (11) for generating a trigger in response to detecting surges, spikes and overvoltage conditions in the AC or DC power source and providing the trigger to the fast electronic switch (7c); a power supply (12) for supplying the energizing current to the energizing coil (7b); and a voltage control means (10) for supplying voltage to the peak detector (11) and the power supply (12); the voltage control means (10) comprising an attenuator cum spike shunt circuit (15) connected to the power supply feed lines and a fast bridge rectifier circuit (16) connected to the attenuator cum spike shunt circuit (15).

2. The surge protection device (3) as claimed in claim 1, wherein the SPD (3) comprises of an in-built facility of earth leakage detection.

3. The surge protection device as claimed in claim 1, wherein the line switch (7) is installed in the line carrying the phase when third line for earth connection is used.

4. The surge protection device as claimed in claim 1, where the line switch (7) is installed in the line carrying the phase and fuse where possibility of earth leakage exists and/or the supply source is not isolated.

5. The surge protection device as claimed in claim 1, wherein the peak detector (11) takes lead in time as it responds to a peak instead of average through a low time delay path of attenuator-cum-spike shunt (15) which protects the fast bridge rectifier and the voltage control means.

6. The surge protection device as claimed in claim 5, wherein the peaks are attenuated far more in filter-cum-time delay (14) and only marginally in the path feeding the Peak Detector (11).

7. The surge protection device as claimed in claim 1, wherein the filter-cum-time delay (14) is a combination of inductors and capacitors.

8. The surge protection device as claimed in claim 1, wherein the power supply lines (1 and 2) to the load (4) through the line switch (7) pass through a choke (5, 5a, 5b) to cause delay to the supply passing through the line switch (7), surge arrestor and load (4) but not the feed to the controlled power source.

9. The surge protection device as claimed in claim 8 wherein the said choke (5) is a common mode choke for power supply lines (1 and 2) feeding the load.

10. The surge protection device as claimed in claim 1, wherein the power supply line (1) of the load comprises of a fuse (9) and optionally a fuse blown indicator in series on either side.

11. The surge protection device as claimed in claim 1, wherein the load (4) has an in-built surge/spike arrestor on the load side after the fuse, and voltage rating higher than the line switch trigger voltage to blow the fuse placed after the line switch and before the spike arrestor in device (3) in case of failure of line switch (7) or itself.

12. The surge protection device as claimed in claim 1 wherein the said device is provided in main and standby switchable configuration with a changeover switch.

13. The surge protection device as claimed in claim 1, wherein, the device (3) comprises of a controlled power source (6) to work as an energy source required to prevent temporary disruption of energy supply to the load/equipment during the temporary disconnection caused by the line switch (7) operation.

14. The surge protection device as claimed in claim 1, wherein an in-built facility for earth leakage detection for any or all cable conductors is connected to a device (3) independently in an isolated electrical circuit with suitable test enabling push to test switches and different colored indicators for each line to indicate whether there is earthing leakage or not in any of the lines individually.

15. The surge protection device as claimed in claim 1 wherein the device (3) can be used in railway rolling stock mounted equipment, telecommunication equipment, as well as in all general LED lighting applications.

16. The surge protection device as claimed in claim 1, wherein the peak detector (11) has a preset threshold to trigger the Line Switch (7) in time sequence which will not allow any damage to the spike/surge arrestor (8).

17. The surge protection device as claimed in claim 1, wherein the circuit breaker operation time is less than the time for which surge protector/spike arrestor can survive for a voltage and energy limit.

18. The surge protection device as claimed in claim 1, wherein the load has a self restoring line switch (7) with faster operating time than the operating time of a in-built surge/spike arrestor.

19. The surge protection device as claimed in claim 1, wherein the in-built surge/spike arrestor has lower clamping voltage than an external surge/spike arrestor, if provided, in or along the load (4).

20. The surge protection device as claimed in claim 1, wherein the said line switch (7) has a lower operating voltage than the clamping voltage of in-built surge/spike arrestor so that the voltage of in-built surge/spike arrestor does not break down and operate the fuse or external circuit breaker, and whereby the operating voltage of the line switch (7) is also lower than the clamping voltage of external surge/spike arrestor, if any.

21. A method of working of a surge protection device having output terminals (3), for protecting electrical supply systems from surges and spikes resulting from phase decomposition, wherein the operation of a line switch (7) takes a time lead over the surge reaching the output terminals of the SPD, wherein a filter-cum-time delay (14) which is a combination of inductor(s) and capacitor(s) and a controlled power source desists the surge from building up in time to pass through the filter towards the surge protection device (3) output and the delay is further increased as the surge passes over a spike/surge arrestor wherein the operating design of the line switch (7) is well below the upper limit of a normal operating range of the input supply so that at connection of input supply in time sequence a power supply (12) to operate the line switch (7a,b,c) gets ready even before the supply that reaches the load (4) has reached its normal state and is maintained near about the maximum voltage to operate the line switch at its fastest, a power supply (12) to operate the line switch upon trigger from the peak detector (11) such that a peak detector (11) takes lead in time as it responds to a peak instead of average and that also through a low time delay path of attenuator-cum-spike shunt (15) which protects a fast bridge rectifier (16), wherein the peak detector (11) has a preset threshold to trigger the line switch (7) in time sequence which will not allow any damage to the spike/surge arrestor (8) or allow any violation of an input condition of the load to pass through.

* * * * *